Nov. 19, 1957 R. L. DAZEY ET AL 2,813,614
CONVEYORS
Filed Jan. 20, 1955 3 Sheets-Sheet 1

INVENTORS
R. L. DAZEY
J. E. SOLECKI
BY C. B. Hamilton
ATTORNEY

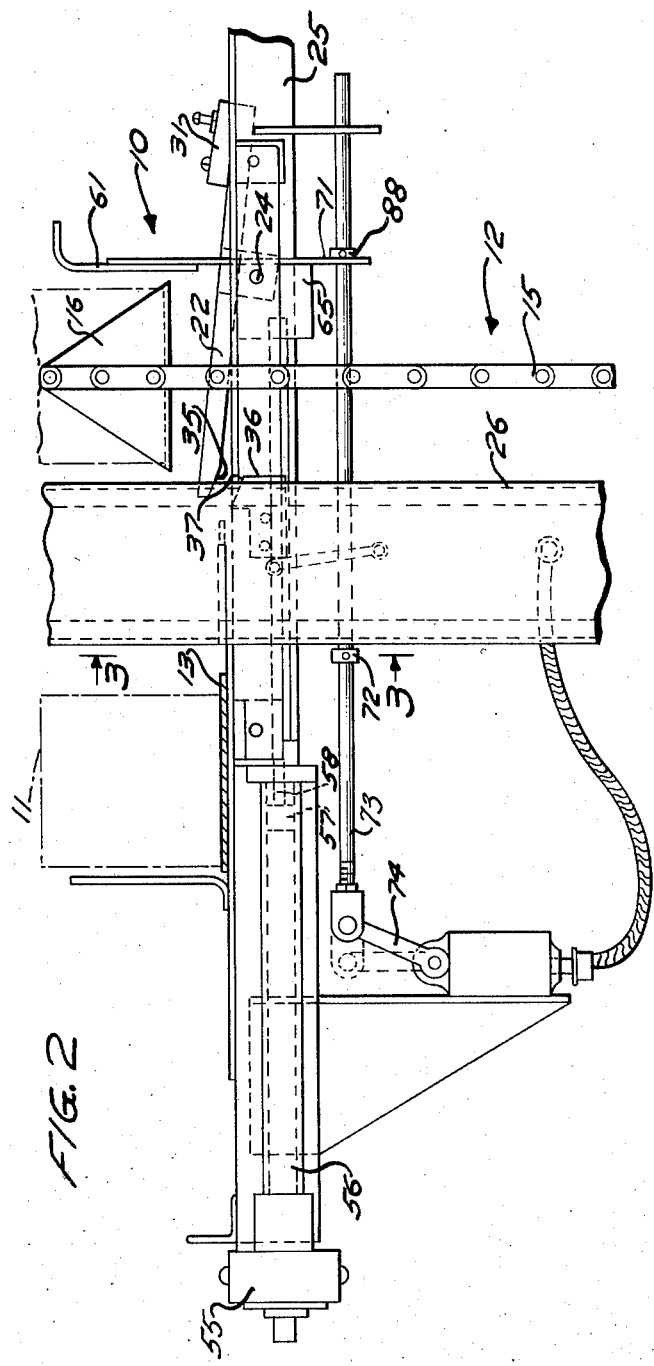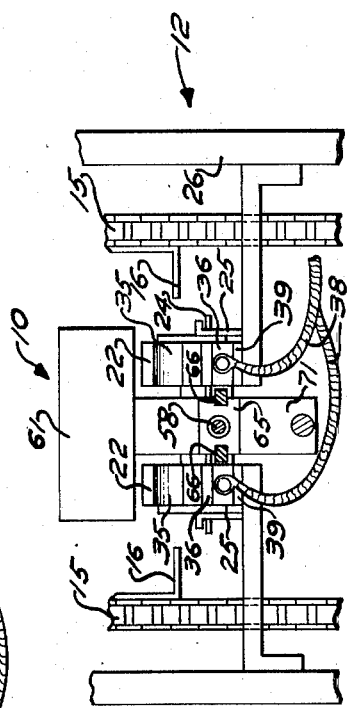

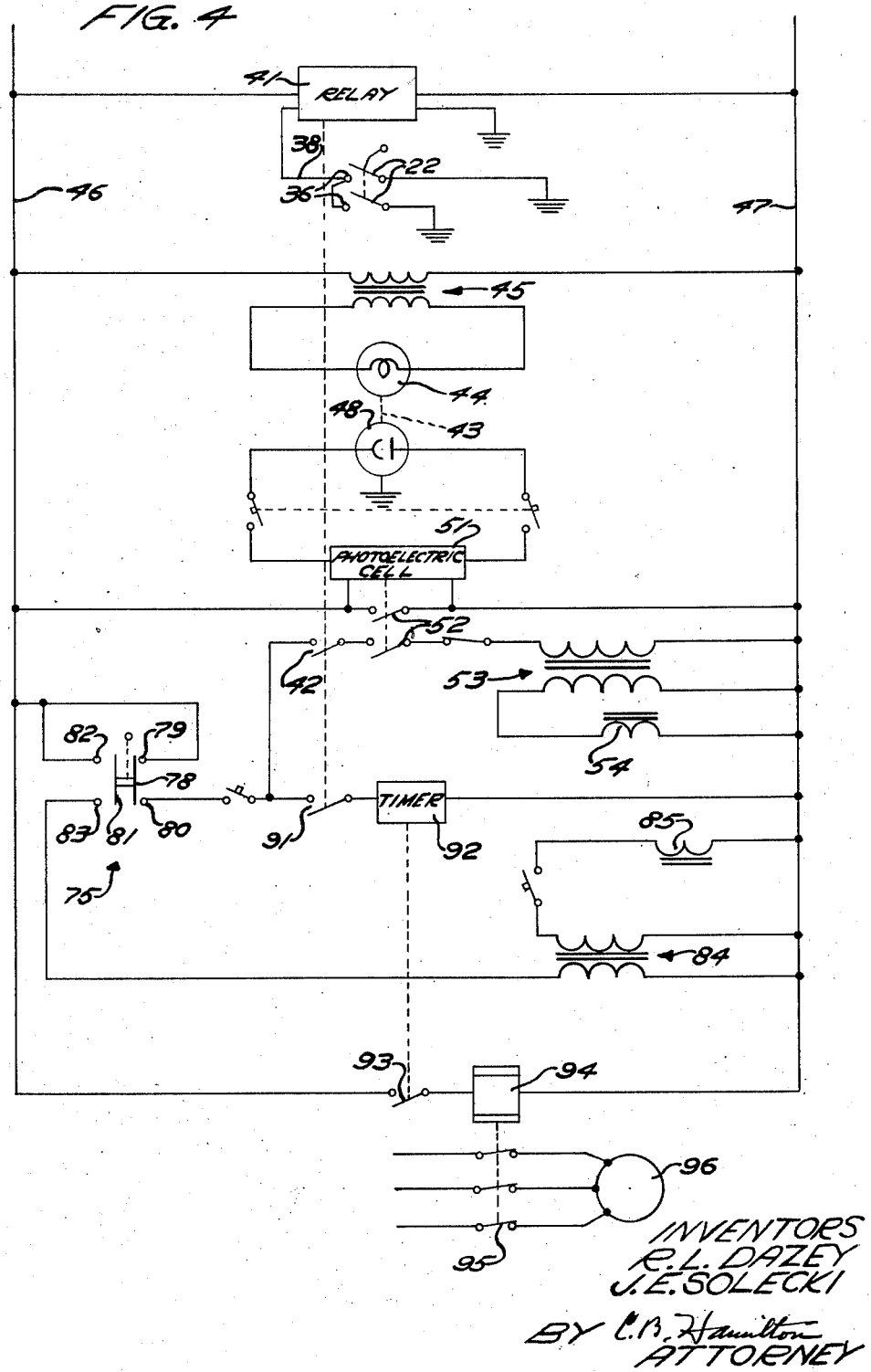

2,813,614
Patented Nov. 19, 1957

2,813,614
CONVEYORS

Russell L. Dazey, Warren, and John E. Solecki, Indianapolis, Ind., assignors to Western Electric Company, Incorporated, New York, N. Y., a corporation of New York Application January 20, 1955, Serial No. 482,938

6 Claims. (Cl. 198—21)

This invention relates to conveyors, and more particularly to devices for transferring cartons from elevators to horizontal conveyors.

An object of the invention is to provide new and improved apparatus for receiving cartons from an elevator and pushing cartons to a horizontal conveyor as the cartons are received.

Another object of the invention is to provide a rugged transfer device for receiving cartons from an elevator chain conveyor and for pushing the cartons to a horizontal belt conveyor.

An apparatus illustrating certain features of the invention may include an endless chain conveyor for carrying cartons upwardly to the level of a horizontal belt conveyor, and placing the cartons one at a time on a pair of pivotally mounted electroconductive rails to depress the rails into engagement with a pair of electroconductive stops normally insulated electrically from the rails. Contact between the rails and the stops actuates an electronic relay to start a pneumatic cylinder to move a pusher along the rails to push a carton on the rails from the rails onto the belt conveyor. Then limit switch means operable by the pusher reverses the pneumatic means to retract the pusher for the next carton A complete understanding of the invention may be obtained from the following detailed description of a conveyor forming a specific embodiment thereof, when read in conjunction with the appended drawings, in which Fig. 1 is a fragmentary top plan view of a conveyor forming one embodiment of the invention;

Fig. 2 is a fragmentary vertical section of the conveyor shown in Fig. 1;

Fig. 3 is a vertical section taken along line 3—3 of Fig. 2, and

Fig. 4 is a diagrammatic view of a control circuit for the conveyor shown in Fig. 1.

Figure 1:
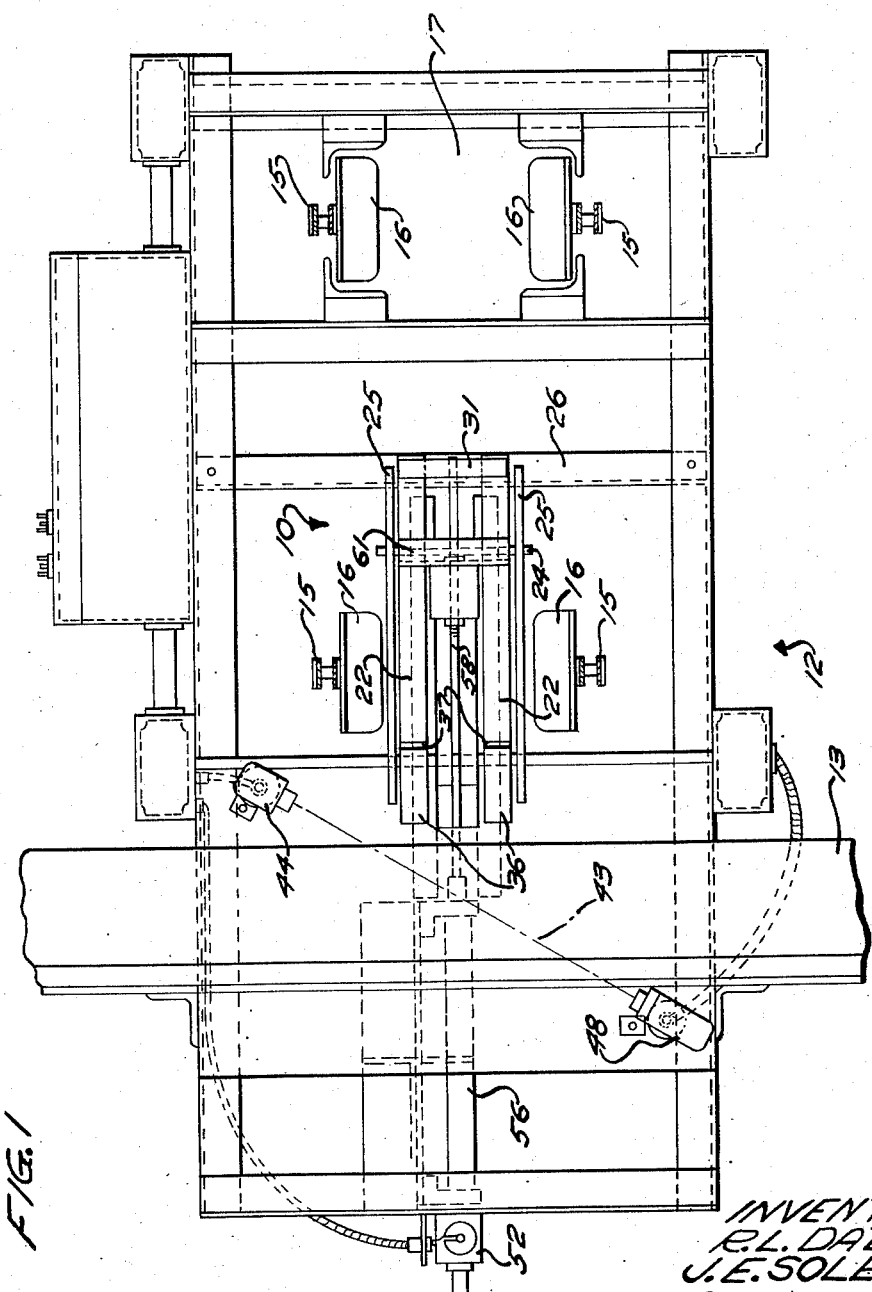

Referring now in detail to the drawings, there is shown therein a transfer mechanism 10 for transferring cartons 11 from an elevator 12 to a belt conveyor 13 receiving other cartons from other elevators similar to the elevator 12. The elevator 12 includes a pair of endless chains 15 coursing endless parallel paths and carrying pendulant supports 16 for receiving the cartons 11, raising the cartons in an upward course above the level of the belt conveyor 13 and lowering the cartons on the transfer mechanism 10, the supports 16 bracketing a pair of conductive supporting rails 22 rigidly fastened together and mounted pivotally on a rod 24 mounted rotatably by and electrically grounded to a grounded frame 26 of the elevator 12 by conductive supports 25. A connector block 31 carried by the rails 22 serves as a counterweight for the rails, and biases the rails in a clockwise direction, as viewed in Fig. 2, to hold contact portions 35 out of contact with electroconductive stops 36 having complementary contacting surfaces 37, the stops 36 being mounted on insulating blocks 39 and being connected by conduits 38 to an electronic relay 41 (Fig. 4) of a well known type.

When the rails 22 engage the stops 36, the electronic relay 41 is actuated to close contacts 42, and, if a light beam 43 from a light projector 44, which is energized by a transformer 45 across powerline conductors 46 and 47, to a photoelectric cell 48 has not been interrupted by a carton already on the belt conveyor 13 and approaching the discharge point of the elevator 12, the cell 48 remains illuminated and a photoelectric relay 51 of a well known type remains energized to keep contacts 52 thereof closed and a transformer 53 is energized. This energizes a solenoid winding 54 of a well known type to actuate a valve 55 (Fig. 2) mounted on a pneumatic cylinder 56 to cause air to be admitted to the righthand end of the cylinder 56, as viewed in Fig. 2, and a piston 57 connected to a piston rod 58 is moved to the left to pull a pushing plate 61 to the left between the rails 22 to push the carton along the rails 22 and on the belt conveyor 13. The piston rod 58 has a guide shoe 65 (Fig. 3) connected thereto which slides along horizontal guides 66.

When the pusher 61 has pushed the carton 11 off the rails 22 and onto the belt conveyor 13, a depending plate 71 carried with the pusher 61 and rigidly fastened thereto engages a collar 72 upon an actuating rod 73 to move a switch arm 74 of a limit switch 75 from a neutral position to a reversing position in a counterclockwise direction, as viewed in Fig. 2. When the switch 75 is so actuated, a contactor 78 (Fig. 4) thereof is moved farther away from contacts 79 and 80 and a contactor 81 is moved into engagement with contacts 82 and 83. When the contactor 81 engages the contacts 82 and 83, a transformer 84 is energized to energize a reversing solenoid winding 85 of the valve 55 to actuate the valve 55 to bring air under pressure into the lefthand end of the cylinder 56, as viewed in Fig. 2, and exhaust the righthand portion of the cylinder. The piston 57 then moves the pusher 61 back to its starting position, the plate 71 moving away from the collar 72 and the arm 74 returns to its neutral position. However, the condition of the valve 55 is not changed by this movement. Then as the pusher 61 returns completely to its righthand position, the plate 71 engages a collar 88 to move the rod 73 to the right, which moves the contactor 78 into engagement with the contacts 79 and 80 to set up the circuit to the forwarding solenoid 54 for the arrival of the next carton at the transfer device 10, the rails 22 having broken their engagement with the stops 36 to drop out the relay 41 prior to such actuation of the switch 75. The relay 41 also is provided with contacts 91 to start a timer 92 on engagement of the rails 22 with the stops 36. If the carton on the rails 22 has not been pushed off before another carton carried by the elevator 12 approaches the carton on the rails, the timer 92 times out to close contacts 93 to energize a relay 94 to break contacts 95 to stop a drive motor 96 of the elevator 12 until the carton on the rails 22 is removed therefrom.

If a carton already on the conveyor 13 approaches the elevator 12 at such a time that a carton being lowered on the rails 22 will be pushed into the carton on the conveyor 13, the latter carton breaks the light beam 43 to drop out the contacts 52 of the relay 51. The carton on the conveyor 13 keeps the relay 51 deenergized until it is out of danger of collision with the carton on the rails 22.

The above-described conveyor is simple and rugged in construction, and requires a minimum of maintenance while being foolproof in operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A conveyor, which comprises a pair of electroconductive stops, a pair of electroconductive rails fixed with respect to one another in parallel positions and movable into contact with the stops, means urging the rails away from the stops, means for placing an article on the rails to move the rails into contact with the stops, means electrically insulating the stops from the rails, means for removing an article from the rails, and relay means operable by contact between the rails and the stops for actuating the removing means.

2. A conveyor, which comprises a pair of electroconductive rails fixed with respect to one another in parallel positions, means mounting the rails pivotally, means urging the rails in one direction, means for placing an article on the rails, a pair of electroconductive stops for limiting pivotal movement of the rails when an article is placed on the rails, means electrically insulating the stops from the rails, means for moving an article along the rails, and relay means operable by contact between the rails and the stops for actuating the moving means.

3. A conveyor, which comprises a pair of electroconductive rails fixed with respect to one another in parallel positions, means mounting the rails pivotally, means urging the rails upwardly, means for placing an article on the rails, a pair of electroconductive stops for limiting downward movement of the rails when an article is placed on the rails, means electrically insulating the stops from the rails, a pusher for pushing an article along the rails, and relay means operable by contact between the rails and the stops for actuating the pusher.

4. A conveyor, which comprises a pusher movable back and forth along a predetermined path, reversible pneumatic means for moving the pusher along said path, a pair of electroconductive rails, means mounting the rails pivotally on a horizontal axis in positions extending along said path, means biasing the rails upwardly, means for placing an article on the rails, electroconductive stop means engageable by the rails when an article is placed on the rails, means electrically insulating the stops means from the rails, means operable by engagement of the rails with the stop means for actuating the pneumatic means to move the pusher along the path in a direction such as to push the article off the rails, and means operable by the pusher as it pushes the article off the rails for reversing the pneumatic means.

5. A conveyor, which comprises a pusher movable back and forth along a predetermined path, reversible means for moving the pusher along said path, electroconductive stop means, a pair of electroconductive rails mounted pivotally on a horizontal axis in positions extending along said path, means biasing the rails upwardly away from the stop means, means electrically insulating the stop means from the rails, means for placing an article on the rails to move them into engagement with the stop means, means operable by engagement of the rails with the stop means when an article is placed on the rails for actuating the reversible means to move the pusher along the path in a direction such as to push the article off the rails, and means operable by the pusher as it pushes the article off the rails for reversing the reversible means.

6. A conveyor, which comprises a pusher movable back and forth along a predetermined path, reversible pneumatic means for moving the pusher along said path, a pair of electroconductive rails, means mounting the rails pivotally on a horizontal axis in positions extending along said path and bracketing the pusher, means biasing the rails upwardly, an elevator for lowering an article onto the rails, electroconductive stop means engageable by the rails when an article is placed on the rails, means electrically insulating the stop means from the rails, electronic relay means operable by engagement of the rails with the stop means for actuating pneumatic means to move the pusher along the path in a direction such as to push the article off the rails, and means operable by the pusher as it pushes the article off the rails for reversing the pneumatic means.

References Cited in the file of this patent

UNITED STATES PATENTS

| 2,328,386 | McCann | Aug. 31, 1943 |
| 2,623,626 | Ditolla | Dec. 30, 1952 |